US007154193B2

(12) United States Patent
Jansen et al.

(10) Patent No.: US 7,154,193 B2
(45) Date of Patent: Dec. 26, 2006

(54) ELECTRICAL MACHINE WITH DOUBLE-SIDED STATOR

(75) Inventors: Patrick Lee Jansen, Alplaus, NY (US); James Patrick Lyons, Niskayuna, NY (US); Ralph James Carl, Jr., Clifton Park, NY (US); Ronghai Qu, Clifton Park, NY (US); James Michael Fogarty, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 10/951,335

(22) Filed: Sep. 27, 2004

(65) Prior Publication Data
US 2006/0071575 A1 Apr. 6, 2006

(51) Int. Cl.
*F03D 9/00* (2006.01)
(52) U.S. Cl. .......................................... 290/55; 290/44
(58) Field of Classification Search ..................... None
See application file for complete search history.

(56) References Cited

U.S. PATENT DOCUMENTS

| | | | |
|---|---|---|---|
| 3,789,252 A | 1/1974 | Abegg | |
| 4,517,484 A | 5/1985 | Dacier | |
| 4,720,640 A | 1/1988 | Anderson et al. | |
| 4,761,590 A | 8/1988 | Kaszman | |
| 4,900,965 A | 2/1990 | Fisher | |
| 5,004,944 A | 4/1991 | Fisher | |
| 5,311,092 A | 5/1994 | Fisher | |
| 5,331,244 A | 7/1994 | Rabe | |
| 5,334,898 A * | 8/1994 | Skybyk | ........................ 310/268 |
| 5,977,684 A * | 11/1999 | Lin | ............................. 310/268 |
| 6,177,746 B1 | 1/2001 | Tupper et al. | |
| 6,462,457 B1 | 10/2002 | Shah et al. | |
| 6,590,312 B1 | 7/2003 | Seguchi et al. | |
| 6,720,688 B1 * | 4/2004 | Schiller | ........................ 310/64 |
| 6,744,504 B1 | 6/2004 | Yokota | |
| 6,762,525 B1 | 7/2004 | Maslov et al. | |
| 6,794,781 B1 | 9/2004 | Razzell et al. | |
| 6,794,783 B1 * | 9/2004 | Tu et al. | ................. 310/156.32 |
| 7,042,109 B1 * | 5/2006 | Gabrys | ........................ 290/44 |
| 2002/0047418 A1 | 4/2002 | Sequchi et al. | |
| 2003/0236036 A1 | 12/2003 | Varis | |
| 2004/0041409 A1 | 3/2004 | Gabrys | |

FOREIGN PATENT DOCUMENTS

DE 4023791 7/1990
DE 4402184 C2 11/1995

(Continued)

OTHER PUBLICATIONS

Ronghai Qu, "Dual-Rotor, Radial-Flux, Toroidally Wound, Permanent-Magnet Machines", 2003 IEEE Trans on Industry Applications, vol. 39, No. 6, pp. 1665-1673.

(Continued)

*Primary Examiner*—Joseph Waks
(74) *Attorney, Agent, or Firm*—Ann M. Agosti; Roger C. Phillips; Patrick K. Patnode (57) ABSTRACT

Machines useful for wind turbine and ship propulsion purposes include a wind turbine generator or a ship propulsion motor with two concentric air gaps. In one embodiment, the machine includes a rotor with an inner rotor core and an outer rotor core; and a double-sided stator with an inner stator side and an outer stator side. The double-sided stator is concentrically disposed between the inner rotor core and the outer rotor core.

12 Claims, 7 Drawing Sheets

FOREIGN PATENT DOCUMENTS

| | | |
|---|---|---|
| DE | 19643362 | 10/1996 |
| DE | 19704652 | 2/1997 |
| DE | 19636591 | 12/1999 |
| EP | 1375913 | 1/2004 |
| EP | 1394406 A2 | 3/2004 |
| EP | 1465326 A2 | 10/2004 |
| FR | 2823178 | 4/2001 |
| GB | 2417140 A * | 2/2006 |
| JP | 53015502 | 2/1978 |
| JP | 56053557 | 5/1981 |
| JP | 56-074075 | 6/1981 |
| JP | 56107767 | 8/1981 |
| WO | WO9939426 A1 | 8/1999 |
| WO | WO02/057624 A1 | 7/2000 |
| WO | WO 01/21956 A1 | 3/2001 |
| WO | WO 2003078834 A1 * | 9/2003 |
| WO | WO 2004040740 A1 * | 5/2004 |
| WO | WO 01/06623 | 1/2005 |

OTHER PUBLICATIONS

US Patent Application, Entitled Electrical Machine With Double-Sided Lamination Stack by Patrick L. Jansen, et al.

"Electrical Machine With Double-Sided Rotor" by Patrick L. Jansen, et al. U.S. Appl. No. 10/882,911, filed Jun. 30, 2004.

"Electrical Machines an Assemblies Including a Yokeless Stator With Modular Lamination Stacks", U.S. Appl. No. 11/014,137, filed Dec. 16, 2004.

Edward Spooner, et al, "Modular, Permanent Magnet Wind-Turbine Generators", 1996 IEEE, pp. 497-502.

USPTO Office Action for U.S. Appl. No. 10/951,329 mailed Aug. 18, 2005.

USPTO Office Action for U.S. Appl. No. 10/951,329 mailed Dec. 22, 2005.

EPO Search Report dated Jan. 16, 2006.

EPO Search Report dated Jan. 20, 2006.

* cited by examiner

ELECTRICAL MACHINE WITH DOUBLE-SIDED STATOR

CROSS REFERENCE TO RELATED APPLICATIONS

This application includes subject matter that is related to U.S. Patent Application Ser. No. 10/951,329, entitled "Electrical Machine with Double-Sided Lamination Stack", filed concurrently herewith, which is herein incorporated by reference.

BACKGROUND OF THE INVENTION

The present invention relates generally to wind turbine generators and ship propulsion motors.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power describe the process by which the wind is used to generate mechanical power or electricity.

Typically, wind turbines are used to convert the kinetic energy in the wind into mechanical power. This mechanical power may be used for specific tasks (such as grinding grain or pumping water) or a generator may convert this mechanical power into electricity. A wind turbine usually includes an aerodynamic mechanism for converting the movement of air into a mechanical motion which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the wind generators. The wind turns the turbine blades, which spin a shaft, which feeds into a gear-box and then connects to a wind generator and makes electricity. The geared drive aims to increase the velocity of the mechanical motion. The drawback of a geared drive is that it reduces the reliability of the wind turbine and increases the noise and cost of the wind turbine.

A few wind turbines utilizing direct-drive generators are also commercially available. The large diameters of the direct drive generators present formidable transportation and assembly challenges, both at the factories and at the wind turbine installation sites. As the wind turbine industry matures and technology improves, larger power ratings will be required to continue the downward push in the cost of energy. Standard power ratings for land-based turbines are expected to be 3 MW or greater in the next few years, and the offshore turbines are expected to be 5 MW or greater.

For the wind turbines to evolve to higher power ratings, conventional approaches typically include an increase in the direct-drive generator diameter or axial (stack) length. Increasing the diameter is preferred from a purely generator electromagnetic perspective, but is not attractive from the transportation, frame, and assembly perspectives, especially for land-based turbines. Increasing the axial length of the generators, while maintaining the diameter to be less than approximately 4.1–4.3 meters, alleviates the land-based transportation issue, but results in complex and costly frame structures with long axial lengths.

It is therefore desirable to provide cost-effective wind turbines of increased power ratings and reduced diameters.

BRIEF DESCRIPTION OF THE INVENTION

Briefly, in accordance with one embodiment of the present invention, a wind turbine is provided. The generator of the wind turbine includes at least two concentric air gaps. In an exemplary embodiment the generator is a double-sided generator that includes at least one rotor with an inner rotor core and an outer rotor core, and at least one double-sided stator with an inner stator side and an outer stator side. The at least one double-sided stator is concentrically disposed between the inner rotor core and the outer rotor core.

Briefly, in accordance with another embodiment of the present invention, a wind turbine generator is provided. The wind turbine generator includes at least two concentric air gaps. The wind turbine generator includes at least one rotor with an inner rotor core and an outer rotor core, and at least one double-sided stator with an inner stator side and an outer stator side. The at least one double-sided stator is concentrically disposed between the inner rotor core and the outer rotor core.

Briefly, in accordance with another embodiment of the present invention, a ship propulsion motor is provided. The ship propulsion motor includes at least two concentric air gaps. The motor includes at least one rotor with an inner rotor core and an outer rotor core, and at least one double-sided stator with an inner stator side and an outer stator side. The at least one double-sided stator is concentrically disposed between the inner rotor core and the outer rotor core.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The present invention includes different embodiments for double-sided generators and motors that are particularly useful for direct-drive wind turbines and ship propulsion units but that also can be used for geared-drive units if desired. The different configurations described herein below are based upon double-sided, radial-flux, synchronous electrical machines. Although permanent magnet (PM) machines are described and shown for the purpose of illustration, other electrical machines such as wound field machines can alternatively be used and field excitation could be achieved by conducting coils carrying current. These configurations contribute towards achieving cost-effective wind turbines of increased power ratings (>2.0 MW) and are especially advantageous for land-based applications where the outside diameter may be constrained by transportation limitations.

Figure 1:
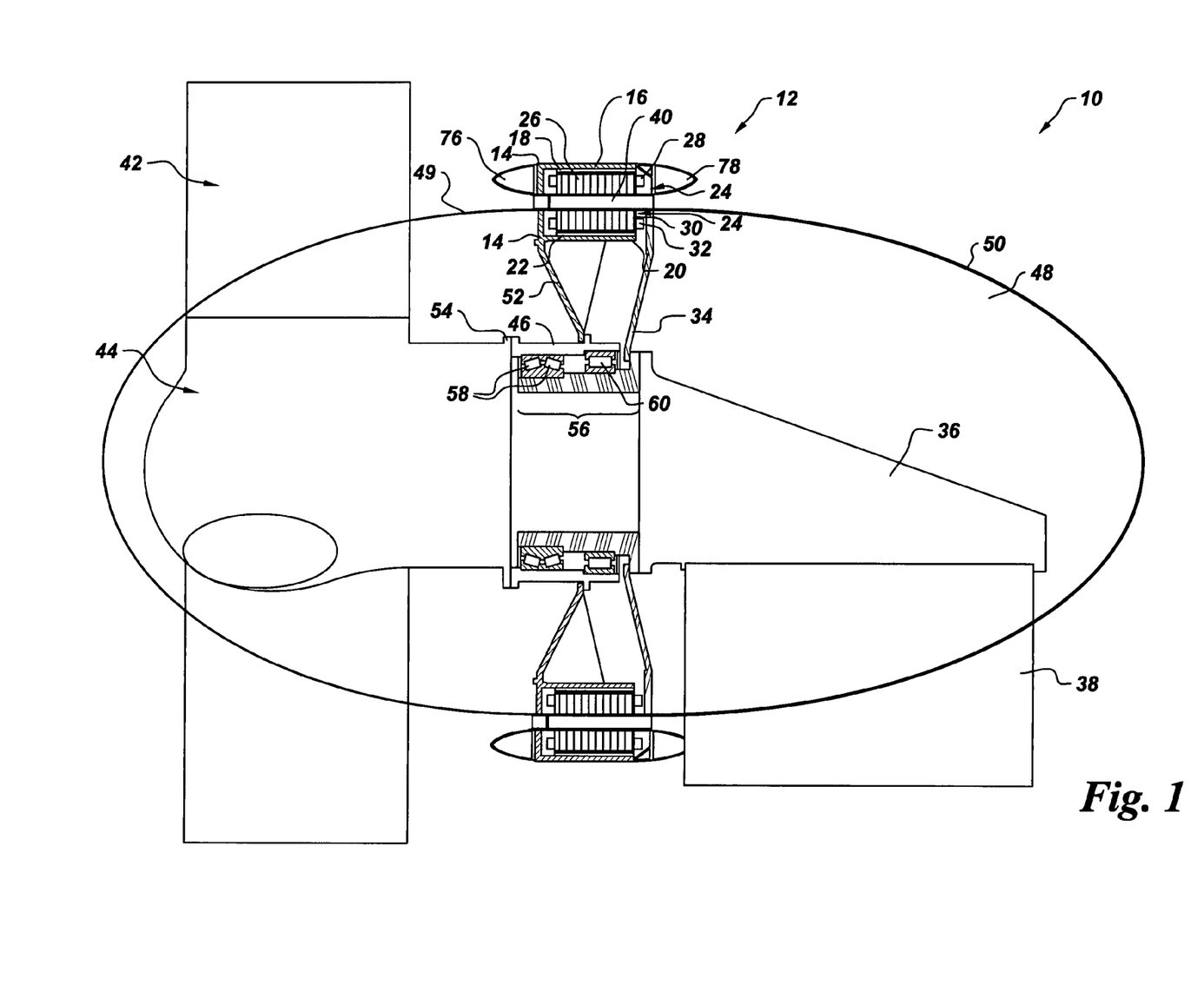
FIG. 1 illustrates a sectional view of a wind turbine comprising an exemplary direct-drive double-sided generator.

Turning now to the figures, FIG. 1 is a diagrammatic representation of a sectional view of a wind turbine 10 with an exemplary embodiment of a direct-drive double-sided PM generator 12. The PM generator 12 of the wind turbine 10 includes at least two concentric radial flux air gaps (not shown in FIG. 1 and discussed later in reference to FIG. 2), thereby effectively converting the PM generator 12 into two concentric generators. Thus, it would be appreciated by those skilled in the art that for the same total envelope defined by the outside diameter and axial length, the PM generator 12 can produce considerably more power output than a single-sided generator. In practice, thus a 2 MW single-sided generator might be replaced by a double-sided generator capable of producing 3–3.6 MW for the same total diameter and axial length. Equivalently, a 3 MW single-sided PM generator having a diameter of 6 meters might be replaced with a double-sided generator of the same axial length with only a 4.3 meter diameter, thereby enabling land-transportation of the entire generator as one unit.

One exemplary embodiment of the wind turbine 10, as shown in FIG. 1 includes a rotor 14 in the generator 12. The rotor 14 includes an outer rotor core 16 with outer permanent magnets 18 or alternatively excitation coils and an inner rotor core 20 with inner permanent magnets 22 or excitation coils. The generator 12 also includes a double-sided stator 24 with an outer stator side 26 with outer stator windings 28 and an inner stator side 30 with inner stator windings 32. In operation, the power output of the double-sided stator 24 is fed and controlled by a power converter unit (not shown) capable of full power conversion. The stator 24 is connected to a stationary frame 34, which is further mounted to a main frame 36. The main frame is further mounted to a tower 38 through a conventional yaw bearing and gear drive system (not shown). In a more specific example a cooling channel 40 may be disposed between the outer stator side 26 and the inner stator side 30. More detailed features of the generator 12 are described herein below with reference to FIG. 2.

The wind turbine 10 as shown in FIG. 1, also includes rotor blades 42 connected to a rotor blade hub 44 which has a rotor hub cover 49. The rotor blade hub 44 connects to generator rotor 14 through a rotor torque tube 46. Rotor 14 (generator rotor) is connected to rotating frame 52. A nacelle cover 50 typically protects the components inside the nacelle from the environment. Rotor blade hub 44 is further mounted to a flange 54 on the main rotating torque tube 46. A stationary hub 56 connects the rotor torque tube to the main frame 36 through a bearing assembly. Although two main bearings, front main bearings 58 and rear main bearings 60, are illustrated, alternative bearings configurations, including a single main bearing, are possible. Access to the rotor blade hub 44 is obtained through either access ports in the rotating and stationary frames (i.e., between the PM generator 12 and the main bearing assembly 56), or optionally through the main stationary hub and bearing assembly 56. It will be appreciated by those skilled in the art, that the main bearing and shaft diameters may be sized accordingly with the means for hub access; e.g., larger-diameter main bearings (about 1.5 meters or more, for example) would facilitate hub access. The use of lower-cost small diameter bearings less than or equal to about 1.0 meter, for example, would likely require hub access through access ports.

Figure 2:
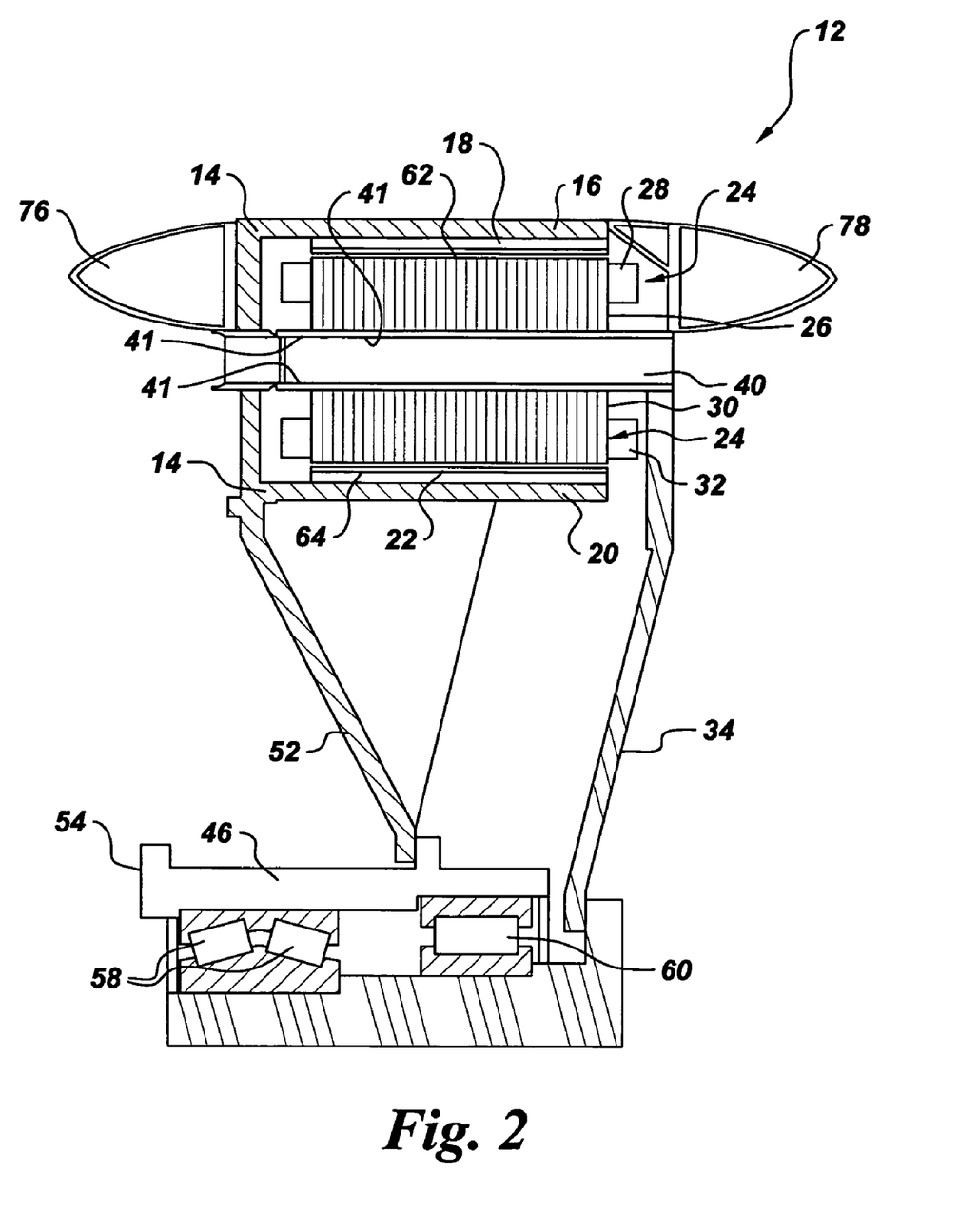
FIG. 2 illustrates a sectional view of the exemplary generator of FIG. 1 with a double-sided stator and a rotor.

Assembly of the wind turbine 10 at the installation site is typically done by first lifting the main frame 36, followed by the PM generator 12 (including the main shaft and bearing assembly 56), and then the turbine, rotor hub 44, and blades 42. The nacelle cover 50 is installed as a last step. FIG. 2 is a detailed view of the PM generator 12 of FIG. 1. The PM generator 12, as also described hereinabove, includes rotor 14 with an outer rotor core 16 and an inner rotor core 20, and the stator 24 with an outer stator side 26 and an inner stator side 30. The outer rotor core 16 is inverted with respect to the inner rotor core 20. Each rotor core has respective permanent magnets, outer permanent magnets 18 and inner permanent magnets 22 or permanent magnet pole assemblies attached to the side facing stator 24. Stator 24 is concentrically disposed between the outer rotor core 16 and the inner rotor core 20. The outer stator side 26 and the inner stator side 30 contribute to the at least two concentric radial flux air gaps 62, 64. Cooling channel 40 separates the outer stator side 26 and the inner stator side 30. In a specific embodiment, cooling channel 40 also includes a stator core support 41 which is mechanically coupled to stationary frame 34 and provides a mounting surface and stiffness to the stator 24. The stator core support 41 is preferably manufactured of fabricated steel or cast iron, although it may also be of aluminum or any other common structural material that is also a good thermal conductor.

Multiple methods of cooling the PM generator 12 are possible, including but not limited to air cooling via ducted wind, forced air cooling via blowers or fans, and liquid cooling. In one specific embodiment as shown, the cooling of the PM generator 12 is accomplished via wind flowing through the cooling channel 40 integrated within the stator core support 41 and stationary frame 34 and cooling the outer stator side 26 and the inner stator side 30. Aerodynamically shaped covers on the front (nose cone) 76 and rear 78 of the PM generator 12, in addition to aerodynamically shaped rotor hub cover 49 and nacelle cover 50 (as shown in FIG. 1), direct the naturally blowing wind to flow through the cooling channel 40.

Figure 3:
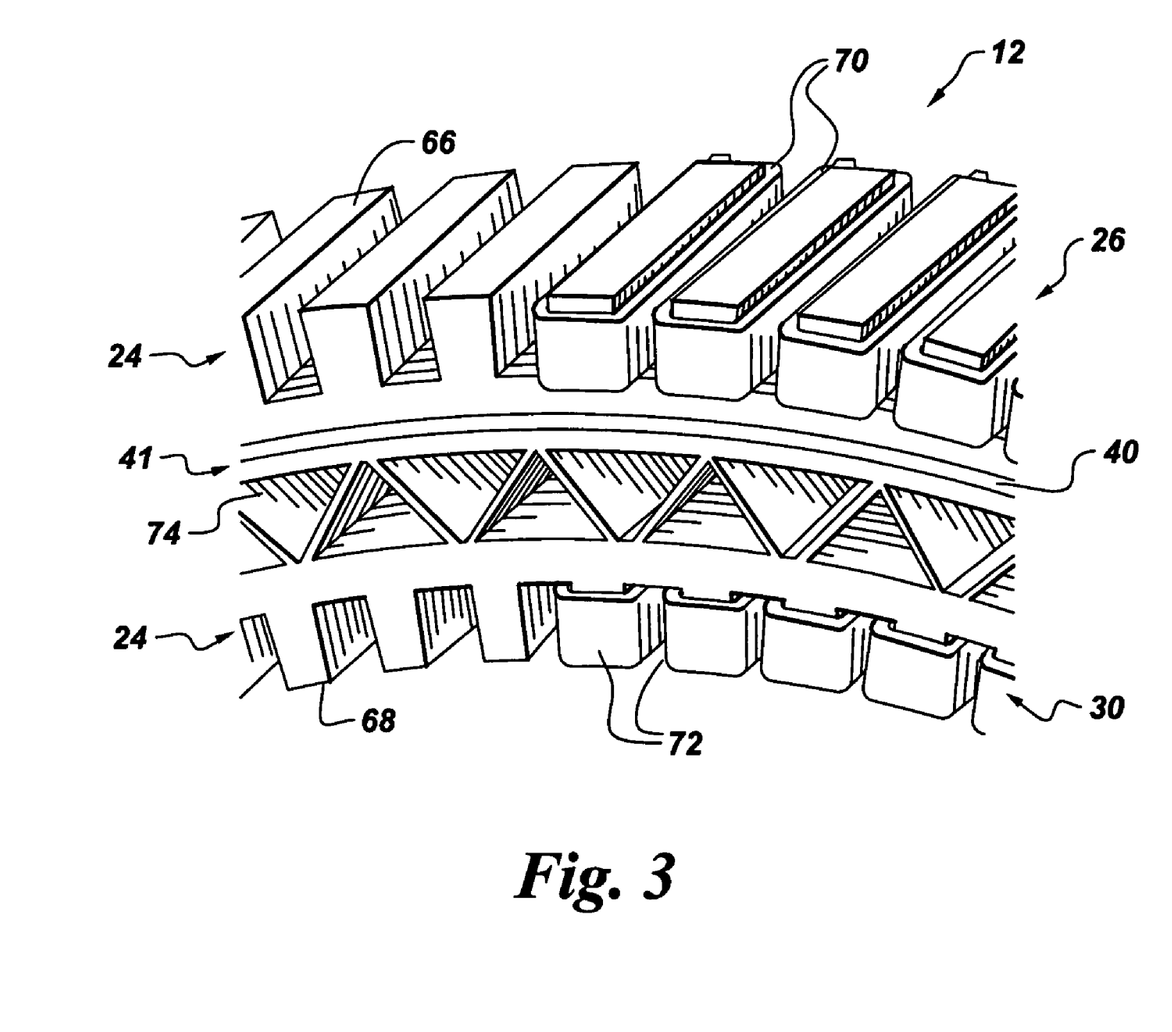
FIG. 3 illustrates a three-dimensional sectional view of the double-sided stator of FIG. 2.

FIG. 3 illustrates an enlarged three-dimensional sectional view of the double-sided stator 24 as described hereinabove with respect to FIG. 1 and FIG. 2. In the embodiment of FIG. 3, the outer stator side 26 and the inner stator side 30 as shown in FIG. 1, each include a respective core stack of laminations, outer core laminations 66 and inner core laminations 68. As illustrated, the outer stator core lamination stack 66 and the inner stator core lamination stack 68 are thermally-coupled to the cooling channel 40 through the stator core support 41. The stator laminations are typically compressed and mounted on the stator core support 41, in one example. Several well-known methods for attaching the core stack of laminations 66, 68 to a surface 74 of stator core support 41 are possible, including a bolted frame construction. Respective stator windings 70, 72 are inserted in the slots formed between the teeth of the stator core stack. The windings may be of any type and configuration common to polyphase AC electric machines. In a specific example, the windings are concentrated coils that each surround an individual stator tooth. Each coil is connected to one phase of the machine forming at least one 3-phase set of balanced windings. Typical toothed windings have ½ slots per pole per phase; e.g., 64 poles, 3 phases, and 96 slots (coils) per stator side. Many other possibilities exist, such as windings having ⅔ slots per pole per phase; e.g., 80 poles, 3 phases, and 96 slots (coils) per stator side. More conventional windings such as distributed two layer lap windings are also possible.

Figure 4:
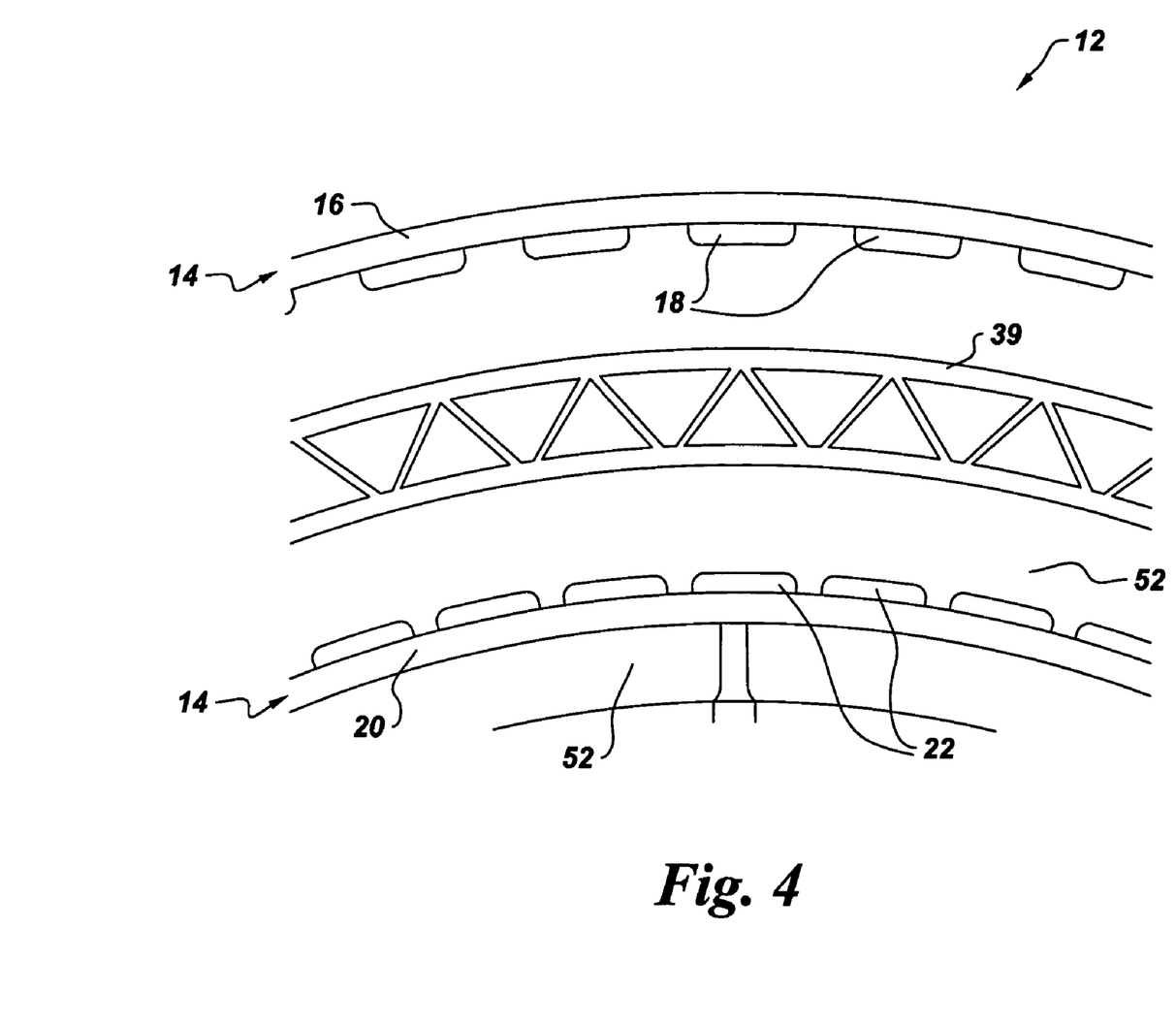
FIG. 4 illustrates a diagrammatic representation of the rotor of FIG. 2.

FIG. 4 illustrates a diagrammatic representation of the rotor 14 as described hereinabove with respect to FIG. 1 and FIG. 2. Rotor 14 has an outer rotor core 16 and an inner rotor core 20 and their respective permanent magnets (18 and 22) attached to the rotating frame 52. As illustrated, the permanent magnets 18 and 22 associated with outer and inner rotor cores may be aligned or alternatively, angularly shifted, i.e. they may be configured to be offset, to significantly reduce the net torque pulsation caused by cogging and winding harmonics with only a small reduction in the torque capability or net efficiency of the generator. FIG. 4 also illustrates an air passage channel 39 to enable air flow to the cooling channel 40 in the stator (see FIG. 3), disposed between and spaced apart from the outer rotor core 16 and the inner rotor core 20.

Figure 5:
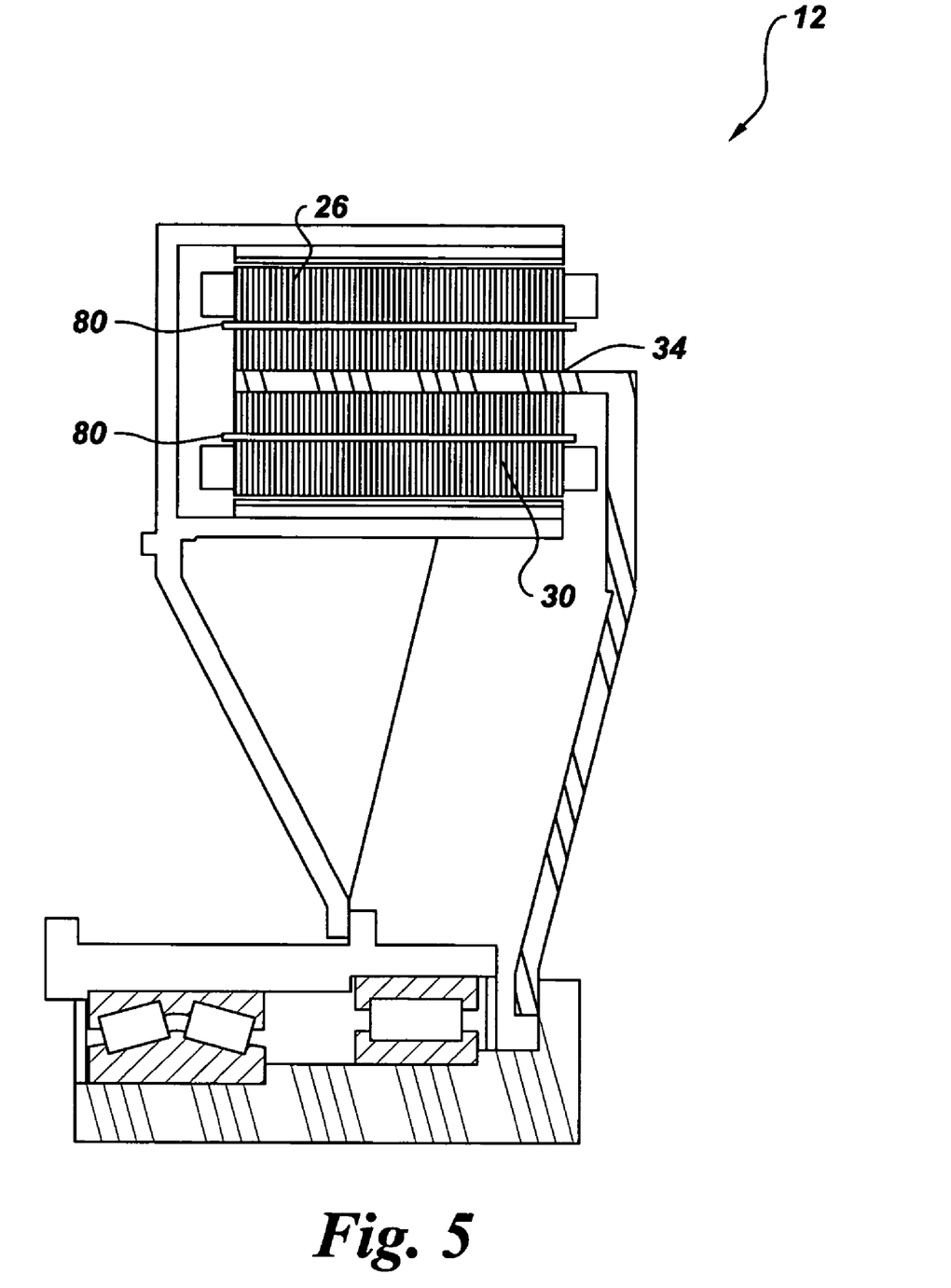
FIG. 5 illustrates an exemplary embodiment with liquid cooling pipes in the arrangement of FIG. 2.
Figure 6:
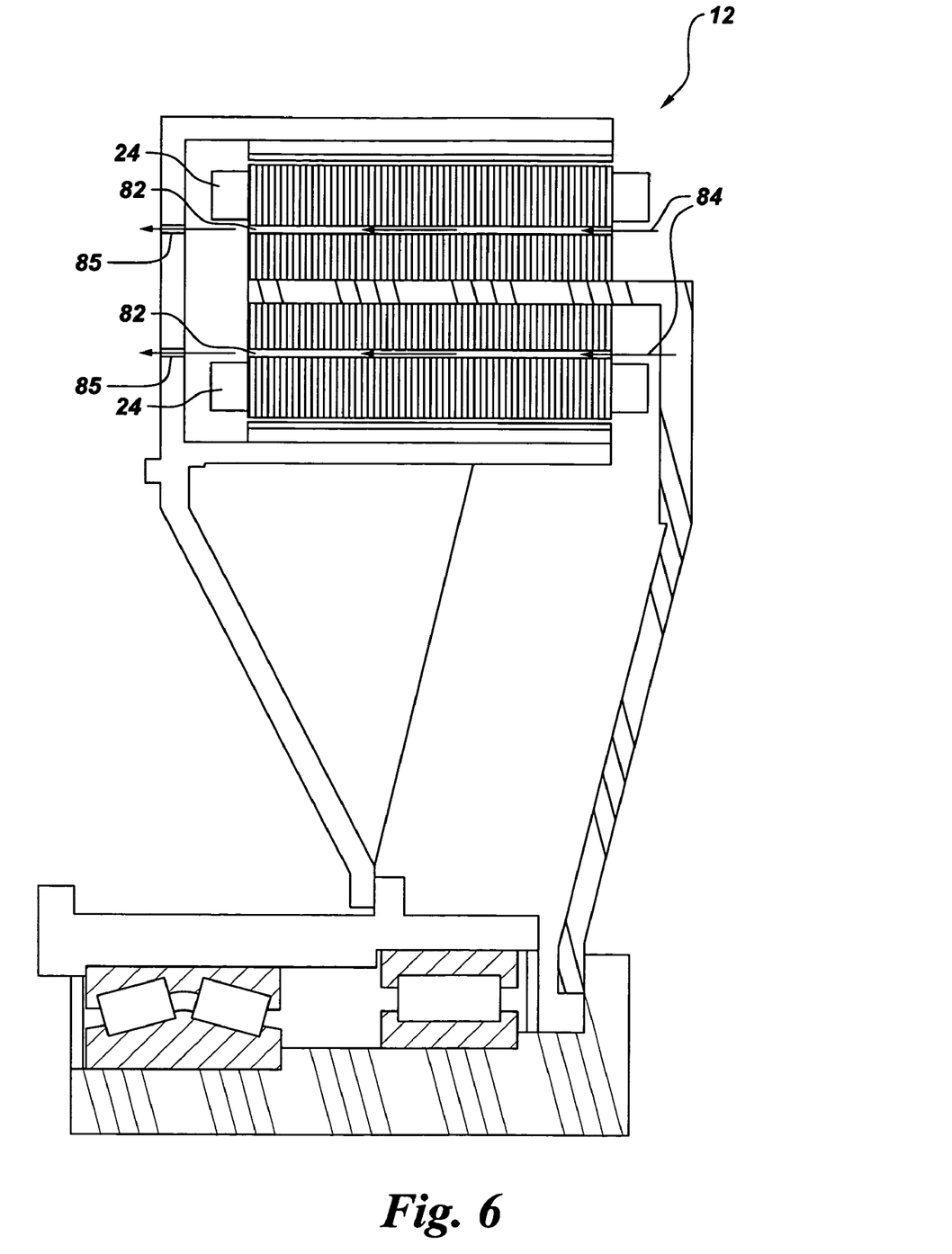
FIG. 6 illustrates an exemplary embodiment having holes for forced air cooling in the arrangement of FIG. 2.

FIG. 5 and FIG. 6 illustrate two specific exemplary embodiments for cooling the PM generator 12 of FIG. 1 and FIG. 2. In the embodiment illustrated in FIG. 5, the PM generator 12 includes a liquid cooling pipe 80 as a cooling channel placed adjacent to at least one of the outer stator side 26 and the inner stator side 30. The liquid cooling pipe 80 may be placed adjacent to either the coils or teeth of the outer or inner stator side. The liquid cooling pipe 80 uses a liquid for cooling the outer stator side 26 and/or the inner stator side 30. Liquid cooling pipe 80, in one example, is placed in the bottom of the slots of both sides or on either side of stator 24. The liquid used is typically at least one of water-glycol and de-ionized water, but any other liquid commonly used for cooling of electric machines may be used. Cooling pipe 80 may be of any material used for manufacturing the cooling pipes for example aluminum, copper, stainless steel or any combination thereof and may use any other material commonly used for cooling of electric machines. Cooling pipe 80 may be connected in a range of series and parallel connections with one or multiple circuits. A heat exchanger (not shown) may be used to transfer the heat absorbed in the cooling liquid to the ambient air. Liquid cooling is advantageous since it provides a more compact machine that may be totally enclosed for protection from the environment. In particular, in the examples of liquid cooling described above, the net stator core thickness is reduced as compared to a wind cooled design. It therefore enables the diameter of the inner air gap 64 (FIG. 2) to increase, thereby enabling increased power capability of the PM generator 12 for the same total outside diameter and axial length.

In another example as shown in FIG. 6, cooling in the PM generator 12 is achieved by providing a plurality of axial holes 82 in stator 24. The plurality of axial holes 82 may be located at a variety of locations such as, for example, in the bottom of the stator slots (between the stator windings and the core as illustrated), in the back of the stator yokes near the frame, in the stator teeth, or even between individual stator coils. The plurality of axial holes 82 may also be punched in the stator core laminations or exist simply in spaces between the coils or the coils and the core laminations. The air flow may flow in the same direction 84 for both stator sides, as illustrated, or may flow down one stator and back the other. Exhaust holes 85 may be provided in the rotating frame for unidirectional air-flow. In yet another example, a blower (not shown) may be used to force air at substantially high velocities through the plurality of axial holes 82. The air flows in this example from ambient air providing an open-ventilated configuration. Another exemplary embodiment includes a heat exchanger to form an enclosed forced-air configuration.

The double-sided generator 12 as described in different embodiments hereinabove, offers several advantages over single-sided generators for wind turbines. The most significant advantages include a reduction in frame mass for a given power rating, and/or alternatively an increased power rating with a generator that fits within a given transportation envelope. Additional advantages include for example, the radial magnetic forces in the two concentric air gaps act in opposing directions, thereby canceling or at least greatly reducing the net radial magnetic force at each circumferential position along the gap. This reduces the radial deflection of the stator, and also reduces vibration and noise.

Figure 7:
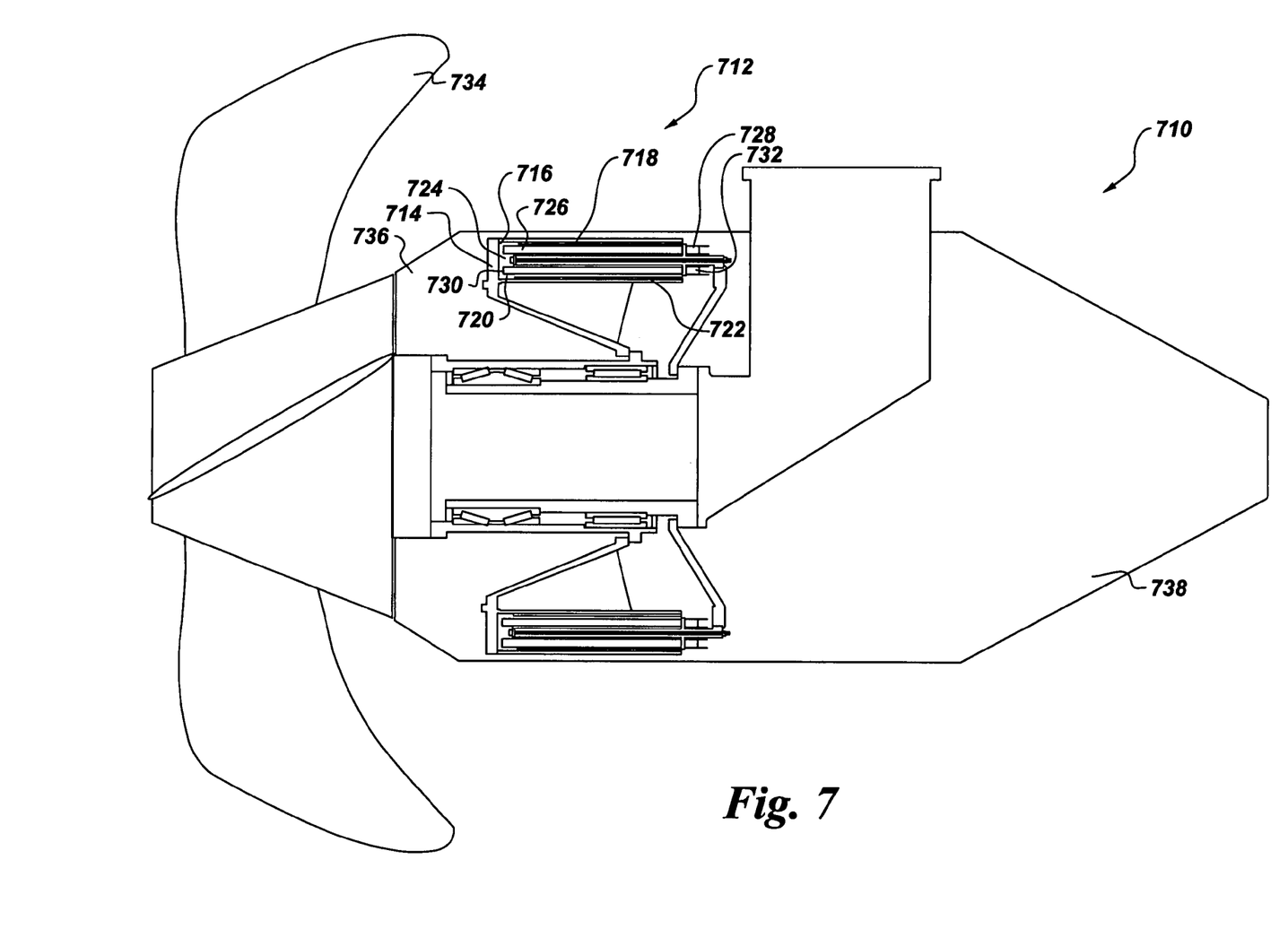
FIG. 7 illustrates a sectional view of a propulsion pod unit for ships comprising an exemplary double-sided ship propulsion motor.

Although embodiments of the present invention have been described primarily in terms of wind turbines, the concepts are additionally useful in other applications with one example being ship propulsion motors. FIG. 7 illustrates a sectional view of a ship propulsion pod unit 710 comprising an exemplary double-sided ship propulsion motor 712, a propeller 734, a mounting and bearing assembly 736, and a frame assembly 738. The ship propulsion motor 712 comprises a rotor 714, including an outer rotor core 716 with outer permanent magnets 718 and an inner rotor core 720 with inner permanent magnets 722. The motor 712 also includes a double-sided stator 724 with an outer stator side 726 with an outer stator winding 728 and an inner stator side 730 with inner stator windings 732. The at least one double-sided stator is concentrically disposed between the inner rotor core and the outer rotor core of the ship propulsion motor. Many of the specific rotor construction details are similar to the wind turbine embodiments and are not repeated here.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A wind turbine generator comprising:
   at least one rotor with an inner rotor core comprising at least one first permanent magnet and an outer rotor core comprising at least one second permanent magnet; and
   at least one double-sided stator with an inner stator side comprising an inner stator winding and an outer stator side comprising an outer stator winding,
   wherein the at least one double-sided stator is concentrically disposed between the inner rotor core and the outer rotor core of the wind turbine generator, wherein the inner stator side and the outer stator side contribute to at least two concentric air gaps; and wherein the at least one rotor and at least one double-sided stator cooperate to produce at least 2.0 megawatts of power.

2. The wind turbine generator of claim 1, further comprising at least one cooling channel separating the inner stator side and the outer stator side.

3. The wind turbine generator of claim 2, wherein the at least one cooling channel is configured for using wind for cooling the inner stator side and the outer stator side.

4. The wind turbine generator of claim 3, wherein the at least one cooling channel comprises a stator core support coupled to a stationary frame.

5. The wind turbine generator of claim 1, further comprising at least one liquid cooling pipe placed adjacent to at least one of the inner and outer stator sides.

6. The wind turbine generator of claim 1, further comprising a plurality of axial holes situated in the at least one double-sided stator and configured for enabling cooling air to flow through the stator.

7. The wind turbine generator of claim 1, wherein the wind turbine generator comprises a direct-drive generator.

8. A wind turbine comprising:
a wind turbine generator comprising:
- at least one rotor with an inner rotor core comprising at least one first permanent magnet and an outer rotor core comprising at least one second permanent magnet, and
- at least one double-sided stator with an inner stator side comprising an inner stator winding and an outer stator side comprising an outer stator winding, wherein the at least one double-sided stator is concentrically disposed between the inner rotor core and the outer rotor core, wherein the inner stator side and the outer stator side contribute to at least two concentric air gaps and wherein the wind turbine generator produces at least 2.0 megawatts of power.

9. The wind turbine of claim 8, further comprising at least one cooling channel separating the inner stator side and the outer stator side.

10. The wind turbine of claim 8, further comprising at least one liquid cooling pipe placed adjacent to at least one of the inner stator side and the outer stator side.

11. The wind turbine of claim 8, further comprising a plurality of axial holes situated in the at least one double-sided stator and configured for enabling cooling air to flow through the stator.

12. The wind turbine of claim 8, wherein the wind turbine generator comprises a direct-drive generator.

* * * * *